United States Patent [19]

Moerman

[11] 4,162,522

[45] Jul. 24, 1979

[54] APPARATUS FOR FREQUENCY CONVERSION BY ELECTROMAGNETIC INDUCTION

[76] Inventor: Nathan A. Moerman, 7310 Maple Ave., Chevy Chase, Md. 20015

[21] Appl. No.: 849,916

[22] Filed: Nov. 9, 1977

Related U.S. Application Data

[62] Division of Ser. No. 762,896, Jan. 26, 1977, Pat. No. 4,112,347, which is a division of Ser. No. 635,007, Nov. 25, 1975, Pat. No. 4,020,440.

[51] Int. Cl.$^2$ .............................................. H02M 5/16
[52] U.S. Cl. .................................................... 363/171
[58] Field of Search .................. 323/6, 40, 48, 56, 57, 323/58, 60, 61; 363/170, 171, 172

[56] References Cited

U.S. PATENT DOCUMENTS

| | | | |
|---|---|---|---|
| 3,387,203 | 6/1968 | Munnelly | 363/171 |
| 3,654,546 | 4/1972 | Wanlass | 323/6 |

Primary Examiner—Gerald Goldberg
Attorney, Agent, or Firm—Thomas O. Maser

[57] ABSTRACT

Apparatus for conversion of alternating current at a first frequency to alternating current at a second (lower) frequency in a power control circuit by means of progressive variation of magnetic flux in associated magnetic paths. Control is achieved by progressive saturation or domain rotation for selected portions of the magnetic paths to yield a uniformly controllable permeance within the magnetic paths. Feedback circuits provide a means for external control of the output in combination with a reference source.

1 Claim, 5 Drawing Figures

APPARATUS FOR FREQUENCY CONVERSION BY ELECTROMAGNETIC INDUCTION

GOVERNMENT USE

The invention described herein may be manufactured and used by or for the government of the United States of America for governmental purposes without the payment to me of any royalties thereon.

This is a division of application Ser. No. 762,896 filed Jan. 26, 1977 now U.S. Pat. No. 4,112,347, which in turn, was a division of application Ser. No. 635,007 filed Nov. 25, 1975, now U.S. Pat. No. 4,020,440.

RELATED PATENT

This invention is closely related to my U.S. Pat. No. 4,020,440 issued Apr. 26, 1977, which is incorporated by reference.

FIELD OF THE INVENTION

This invention relates to the field of control of electrical energy, and more specifically to the conversion of alternating current from one frequency to another by static magnetic means.

SUMMARY

Control of magnetic flux in a closed magnetic path is accomplished by the progressive control of permeance in an assigned section of the path. Several configurations for continuous permeance control by progressive saturation and/or domain rotation are described in my related U.S. Pat. No. 4,020,440. Utilizing this technology, I have developed a unique apparatus for conversion of alternating current from one frequency to another by purely static magnetic means.

More specifically, in an alternating current power controller, the center leg of a three legged magnetic structure is assigned to the alternating current primary circuit. The outer legs obtain alternating current produced flux through associated permeance control sections controlled in a complementary circuit configuration such that the primary magnetizing current is essentially unchanged as the flux is transferred from one outer leg to the other. A single output winding on either of the outer legs will supply a controlled change in output voltage or current by means of an open loop or feedback amplifier control. Output windings on both outer legs will supply complementary output voltages as the permeance control sections are driven through their total excursions. Feedback circuit configurations enable control of constant voltage or constant current for alternating or direct current loads. In the conversion from a high frequency power source to a low frequency output, the alternating current controller is supplied the high frequency power as its input and the output is amplitude modulated by the low frequency control signal through the electromagnetic induction controlling means. The totally modulated output envelope is rectified to produce the positive and negative lobes, respectively, of the low frequency power waveform.

An object of this invention is to provide a controlled electromagnetic induction means for controlling alternating current power.

Another object of this invention is to reduce size and weight of electrical conversion and control structures by the generation, conversion and control of high frequency electrical power.

A still further object of this invention is to provide an electric power control means responsive to a sensed physical state, such as: voltage, current, power, temperature, pressure, strain, humidity, acidity, or the like.

Another object of this invention is to provide control of electrical power by electronic control of magnetic means in static configurations.

An object of this invention is to provide the means for the computer control of power subsystems in an electric power network.

The exact nature of this invention as well as other objects and advantages thereof will be readily apparent from consideration of the following specification relating to the annexed drawings in which:

DESCRIPTION OF A PREFERRED EMBODIMENT

In this invention, the high frequency alternating current output of a high speed alternating current power generator, for example, is converted to a lower frequency of alternating current power by means of static magnetic circuits responsive to external control means. The high frequency alternating current power input to the magnetic circuit configuration with feedback control interconnection is subjected to an amplitude modulation within the magnetic structure at the desired lower frequency, which is introduced as a control signal in the feedback system.

The modulated envelope of high-frequency power at the output terminals of the magnetic structure is applied to a dual pair of controlled rectifiers which are alternately switched at the zero crossover points of the low frequency control signal. The switched alternate pairs of rectifiers produce alternate positive and negative lobes of power at the low frequency to complete the conversion process.

This invention enables the advantages of the high speed turbine alternator to be more fully realized by the elimination of the gear box and associated reduction in the alternator size and weight. The static magnetic converter operating at the high input frequency is likewise of reduced size and weight. With most of the refined power control invested in the converter, less stringent feedback control to the turbine alternator is required.

For polyphase application, single phase systems are interconnected with appropriate phasing of the respective control signals.

Figure 1:
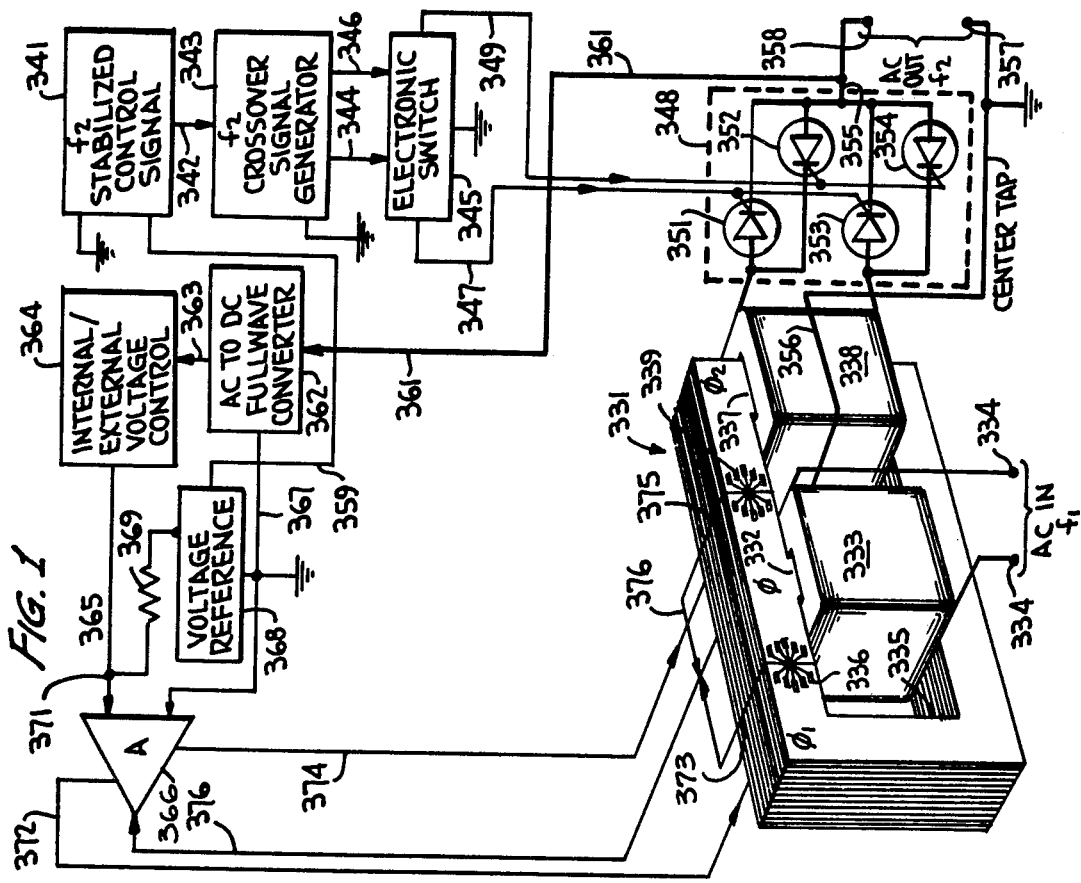
FIG. 1 shows an alternating current power frequency converter.

Turning now to FIG. 1, a permeance controlled power transformer 331, made up of laminated elements has an input leg 332 with an input winding 333 thereon. An alternating current input of a first frequency $f_1$ is applied to winding 333 at terminals 334. Between a bypass path structure 335 and input leg 332 is a first permeance control section 336. A detailed discussion of the permeance control sections may be found in my related U.S. Pat. No. 4,020,440. An output leg 337 has an output winding 338 therearound and there is a second permeance control section 339 located between the output leg 337 and the input leg 332. A bypass path includes the input leg 332, the first permeance control section 336, bypass leg 335 and is completed through the end of the input leg opposite to the end connected to permeance control section 336. An output path includes the input leg 332, permeance control section 339, output leg 337 and is completed through the end of the input leg opposite to the end connected to the permeance control section 339. A source for a second frequency alternating current to which the output from output winding 338 is converted is supplied through a $f_2$ stabilized control signal 341. The output of control signal 341 is applied through connector 342 as the input to $f_2$ crossover signal generator 343. Pulses derived from the zero crossover of the alternating current reference input $f_2$ are respectively associated with the positive and the negative lobes of the $f_2$ waveform. The positive associated lobes, for example, produce signals that are delivered through output connector 344 as an input to an electronic switch 345 and the negative associated lobes produce signals that are delivered through second output connector 346 from generator 343 as a second input to electronic switch 345. A first output of electronic switch 345 is applied through a connector 347 as a first input to a dual pair of commutated demodulating rectifiers 348 and a second input thereto is a connector 349. The commutated demodulating rectifiers 348 can be silicon controlled rectifiers, each with an anode, a cathode, and a gate.

The anode of a first of a first pair of rectifiers, 351, and the cathode of the second of said first pair, rectifier 352, are connected to one end of the winding 338 on output leg 337. The anode of a first of a second pair of rectifiers, 353, and the cathode of the second of said second pair, rectifier 354, are connected to the other end of the winding 338 on output leg 337. The cathode of rectifier 351, the anode of rectifier 352, the cathode of rectifier 353, and the anode of rectifier 354 are all connected to output connector 355. Connector 347 is connected between the output of electronic switch 345 and the gate of rectifiers 351 and 353, respectively, in the commutated demodulating rectifiers 348. The other output of electronic switch 354 is connected through connector 349 to the gate of rectifiers 352 and 354, respectively. A center tap 356 on winding 338 on output leg 337 is connected to the grounded output terminal 358.

The feedback circuitry includes a feedback connector 361 connected at one end to output connector 335 and at its other end to an alternating to direct current fullwave converter 362, a first element in a voltage comparator, such as voltage comparison bridge, and the like. A connector 363 connects converter 362 to an internal or external voltage control 364, the output of which is connected through a connector 365 as an input to a complementary amplifier 366. A connector 367 connects converter 362 to a voltage reference 368, and to said amplifier 366 as a second input thereto, and to a common. A second input to voltage reference 368 is applied through connector 359 which is connected as a second output of the $f_2$ stabilized control signal 341. Connected between the voltage reference 368 and connector 365 at a junction 371 is a fixed voltage drop device 369 to complete the voltage comparison bridge.

The outputs of amplifier 366 are connected through connector 372 to coil 373 of permeance control section 336 and through connector 374 to coil 375 of permeance control section 339, the other ends of coils 373 and 375 being connected to a return connector 376 back to amplifier 366.

OPERATION OF THE FREQUENCY CONVERTER OF FIG. 1

Figure 2:
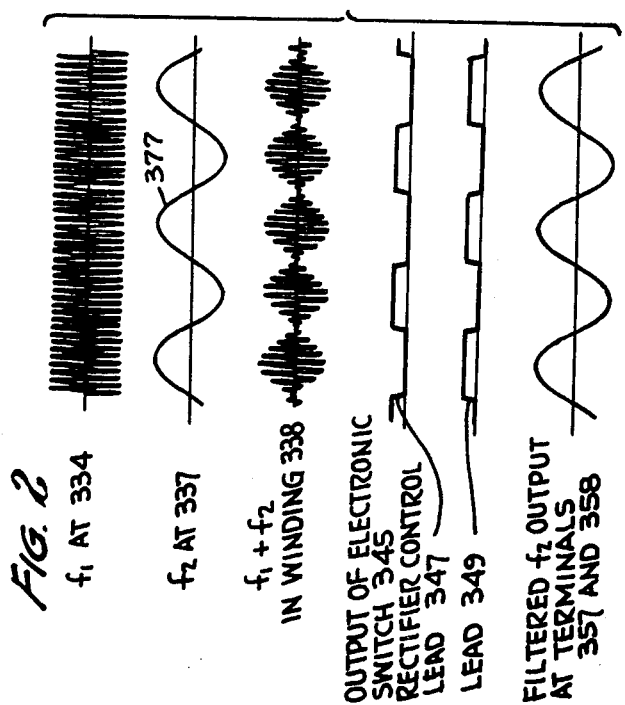
FIG. 2 is a time sequence chart for the operation of the converter of FIG. 1.

The operation of the frequency to frequency converter shown in FIG. 1 is described with the aid of the waveform frequency diagram of FIG. 2. High frequency alternating current input power $f_1$ is connected to input winding 333 of the permeance controlled alternating current to input winding 333 of the permeance controlled alternating current transformer 331, a structure similar to that in FIG. 1 of my related U.S. Pat. No. 4,020,440. A stabilized low frequency sinewave input control signal $f_2$ from $f_2$ stabilized control signal 341 serves to control functions in the conversion of $f_1$ power to $f_2$ power. The first of these functions is the modulation of $f_1$ power through the voltage comparator and permeance control amplifier 366. At the voltage comparator, the reference control signal $f_2$ is presented as a unidirectional fullwave sine waveform, 377 in FIG. 2. This reference voltage is, for example, of positive polarity with respect to ground reference. The feedback reference output signal over lead 359 is similarly converted to a unidirectional fullwave negative sine waveform at the voltage comparator for comparison with the reference voltage. An error signal generated at the voltage comparator and available at junction 371 is directed to the permeance control complementary amplifier 366 to effect the apportioning of flux in the permeance controlled transformer to achieve the complete modulation of the transformed $f_1$ power by the $f_2$ reference signal.

To effect a totally modulated envelope of $f_1$ output power by the $f_2$ reference signal, the voltage comparator provides the means for continuous tracking of the reference waveform by the feedback waveform, where deviations in the feedback signal are detected and amplified through the permeance control amplifier 366. The resulting apportioned drive currents through the permeance control sections 336 and 339 effect a division of magnetic flux from the input leg 332 to the output and bypass legs 337 and 335, respectively, to preserve the total modulation of $f_1$ output.

The second control function of the stabilized $f_2$ input signal is, after the extraction of zero crossover pulses by generator 343, applied to the electronic switch 345, to effect the control of output rectifiers 351, 353 and 352, 354. FIG. 2 shows that while lead 347 is activated to turn off the gates of rectifiers 351 and 353, lead 349 is activated to turn on the gates of rectifiers 352 and 354, and vice versa. The alternate control of rectifier pair 351 and 353 and of rectifier pair 352 and 354 produce a positive and negative lobe from the modulated $f_1$ envelope appearing at output winding terminals 357 and 358 of the permeance controlled transformer.

For compact, lightweight, and mobile high power alternating current power sources, a high speed turbine alternator is desirable. However, the generated power frequency is too high for most applicatoons and must be reduced to standard frequencies, typically 50 or 60 Hertz. In this invention, a permeance controlled transformer is operated at the high frequency output of the turbine alternator and is, accordingly, of small size and weight relative to that required for 50 or 60 Hertz operation. A feedback control system, into which a reference signal of the desired output frequency is injected, contains a means to completely modulate the high frequency power output of the transformer by the low frequency reference carrier signal. Consecutive positive and negative lobes of the desired low frequency power is extracted from the modulated envelope by consecutively switched controlled fullwave rectifiers.

I claim:

1. In an electromagnetic induction means for the conversion of an input high frequency alternating current power source to an output low frequency alternating current power output, an alternating current power transformer means having an input, an output and a bypass variable permeance closed magnetic path means and a first and a second permeance control section, said output path means integral with said first control section and said input path means to form a first closed path, said bypass means integral with said second control section and said input path means to form a second closed path, an input winding means surrounding said input path means, means connecting a high frequency alternating current power source across said input winding means, a low frequency alternating current reference signal source, an output winding means having a pair of end connector means and a central connecting means surrounding said output path means having induced therein a modulated envelope of said input high frequency alternating current input signal by said low frequency alternating current reference signal, a fullwave controlled rectifier combination means connected to said pair of end connecting means to convert said modulated envelope into a low frequency alternating current power output determined by said low frequency reference signal, a crossover signal generator means wherein the zero crossover point of said low frequency alternating current reference signal produces a crossover output signal, means connecting said low frequency signal source to said crossover signal generator means, an electronic switch means having a pair of alternately activated output signal means, means connecting the output of said crossover signal generator means as the controlling inputs to said electronic switch means, means connecting said outputs of said electronic switch means and said fullwave rectifier means to provide the phased commutation thereof, an alternating current to direct current fullwave converter means having a first and a second output means, a voltage comparator means including a voltage reference means and an internal and external voltage control means, said voltage comparator means generating a voltage error output signal, a complementary control amplifier means, a feedback means connected between the output of said fullwave controlled rectifier combination means and said converter means, said first output means of said converter means connected to said internal and external voltage control means, said second output means of said converter means connected as a first input to said complementary control amplifier means, said low frequency reference signal source connected to said voltage reference means, the output of said voltage comparator means connected as a second input to said complementary control amplifier means, the complementary amplifier means energized by said error signal from said voltage comparator means for apportioning the control current between the said first and second permeance control sections to apportion the magnetic flux in the input path between the said output path and the said bypass path in response to the said error signal to stabilize and enable the control of said low frequency alternating current power output, the apportioning of flux between the output and bypass paths enables said input high frequency power to be induced in said output winding in a modulated envelope defined by the low frequency reference signal.

* * * * *